United States Patent [19]

Holroyd et al.

[11] Patent Number: 5,261,505
[45] Date of Patent: Nov. 16, 1993

[54] COLLISION DETECTOR FOR A VEHICLE

[75] Inventors: Trevor J. Holroyd; Timothy E. Tracey; Martin A. Geeves, all of Derby, England

[73] Assignee: Rolls-Royce DSV Limited, London, England

[21] Appl. No.: 888,428

[22] Filed: May 28, 1992

Related U.S. Application Data

[63] Continuation-in-part of Ser. No. 655,021, Feb. 14, 1991.

[30] Foreign Application Priority Data

Mar. 5, 1990 [GB] United Kingdom ............... 9004916

[51] Int. Cl.$^5$ ............................................. B60K 28/10
[52] U.S. Cl. ...................................... 480/274; 280/735; 296/194; 340/436
[58] Field of Search .................... 280/734–735; 180/274, 275, 277, 279; 73/587; 340/436, 665, 669; 296/669

[56] References Cited

U.S. PATENT DOCUMENTS

| | | |
|---|---|---|
| 3,905,015 | 9/1975 | Inose et al. . |
| 4,077,023 | 2/1978 | Boyd et al. . |
| 4,215,878 | 8/1980 | Hirbod . |
| 4,272,102 | 6/1981 | Burkdoll . |
| 4,285,649 | 8/1981 | Jonte et al. ........................ 264/40.1 |
| 4,297,885 | 11/1981 | Hein, Jr. et al. ...................... 73/587 |
| 4,317,368 | 3/1982 | McElroy ................................. 73/587 |
| 4,346,914 | 8/1982 | Livers et al. . |
| 4,352,038 | 9/1982 | Moreton . |
| 4,510,812 | 4/1985 | Feng . |
| 4,707,972 | 11/1987 | Knepper ........................ 56/DIG. 15 |
| 4,842,301 | 6/1989 | Feldmaier ............................ 180/274 |

FOREIGN PATENT DOCUMENTS 2183037 5/1987 United Kingdom .

Primary Examiner—Margaret A. Focarino
Assistant Examiner—Paul Dickson
Attorney, Agent, or Firm—Cushman, Darby & Cushman

[57] ABSTRACT

A collision detector for a vehicle, comprises a waveguide which is locatable on and acoustically isolated from the vehicle. The waveguide allows stress waves to propagate therethrough, and the waveguide is arranged to produce stress wave activity when the waveguide is deformed due to collision. A pair of transducers are acoustically coupled to the waveguide and the transducers convert any stress waves into electrical signals. A processor analyses the electrical signals and gives an output signal to indicate the occurrence of a collision. The transducers detect different frequency bands and the processor compares the electrical signals and indicates the occurrence of a crash if the ratio or difference is greater than a predetermined value. The waveguide is a metallic member which has a glass coating and a protective coating. Alternatively the waveguide may be a fibre reinforced plastic, tin, or a metallic member which has an interface with a semi-rigid plastic member.

12 Claims, 2 Drawing Sheets

COLLISION DETECTOR FOR A VEHICLE

This is a continuation-in-part (CIP) of application Ser. No. 07/655,021, filed on Feb. 14, 1991.

The present invention relates to collision detectors for vehicles.

Vehicles are frequently involved in collisions with other vehicles or with stationary objects, and passengers travelling in these vehicles are frequently injured or killed in these collisions.

One known device to limit the effects of a collision on a passenger is a seat belt, which passes around the waist and shoulder of a passenger to hold the passenger in the vehicle seat.

A further known device to limit the effects of a collision on a passenger is a gas bag, which is inflated when a collision is detected to prevent the passenger moving from the vehicle seat.

The gas bag passenger restraint requires a sensor to detect the occurrence of a collision of the vehicle, and the sensor provides an output to initiate the inflation of the gas bag. The gas bag is required only to inflate for collisions at the front of the vehicle. The sensor must only detect collisions at the front of the vehicle, must be reliable, must not give false indications of collisions and must initiate the inflation of the gas bag within a predetermined time after the start of the collision.

Directionally sensitive accelerometer type sensors are presently used which sense the deceleration of the vehicle due to a collision. When a predetermined deceleration is detected the sensor initiates inflation of the gas bag.

A problem with this approach is encountered when the front most parts of the vehicle are of low stiffness or strength. In such cases there is a problem in detecting the deceleration of the vehicle until the stiffer and stronger engine parts of the vehicle are impacted. When this occurs the deceleration may be sufficiently severe as to allow insufficient time for the gas bag to be inflated. If the collision is with a relatively small object, there is only a local effect in the initial stages of the collision and deceleration is difficult to detect.

The present invention seeks to provide a novel collision detector.

Accordingly the present invention provides a collision detector for a vehicle comprising a waveguide locatable on and acoustically isolated from a vehicle, the waveguide allowing the propagation of stress waves therethrough, the waveguide being arranged such that stress wave activity is produced therein due to the deformation of the waveguide in a collision, at least one transducer being acoustically coupled to the waveguide to detect any such stress waves propagating in the waveguide and to produce an electrical signal corresponding with such stress waves, a processor arranged to analyse said electrical signal to give an output signal to indicate the occurrence of a collision.

The waveguide may comprise a metallic member.

The waveguide may alternatively comprise a fibre reinforced member.

The metallic member may be coated with a brittle material.

The metallic member may only be coated with a brittle material at a region where a collision is to be detected.

The brittle material may be glass, vitreous enamel or a ceramic.

The glass may be protected by a second coating.

The metallic member may be tin.

The waveguide may be plastically deformable.

The metallic member may have an interface with a semi-rigid plastic member.

The processor may be arranged to compare the electrical signals from the at least one transducer at different frequency bands.

The at least one transducer may be a narrow bandwidth transducer.

There may be two or more transducers, the two or more transducers may have different frequency bands.

The processor may be arranged to operate a valve which controls the inflation of a fluid bag.

The present invention will be more fully described by way of example with reference to the accompanying drawings, in which.

Figure 1:
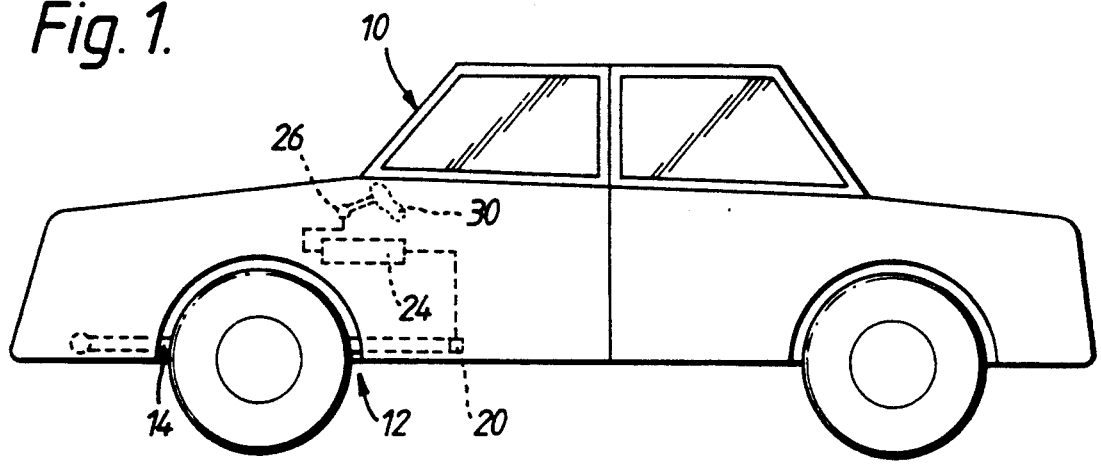
FIG. 1 is a diagrammatical representation of a vehicle with a collision detector according to the present invention.
Figure 2:
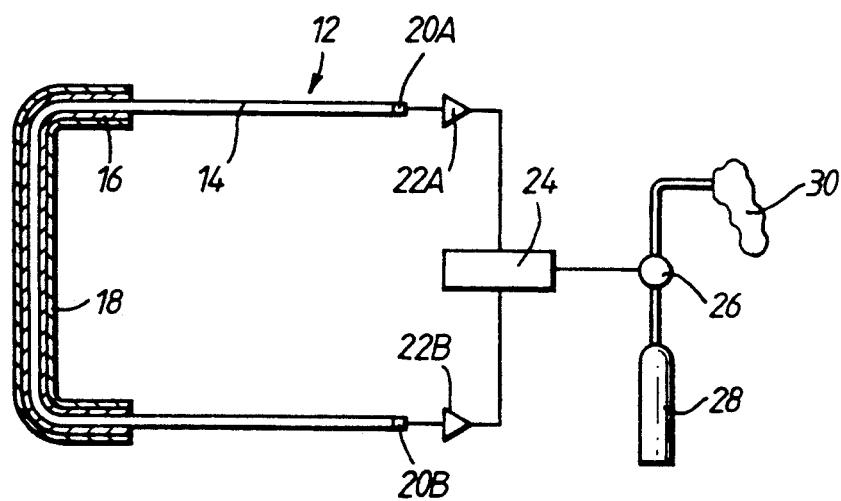
FIG. 2 is a diagrammatical representation of the collision detector shown in FIG. 1.

A collision detector 12 for a vehicle 10 is shown in FIGS. 1 and 2. The collision detector 12 comprises a waveguide 14 which is located on the vehicle body. The waveguide 14 is suitably shaped to follow the contours of the vehicle body, and the waveguide may be a single member or may have a number of parts which are joined by mechanical joints, welded joints or other suitable joints to allow assembly, installation and removal. The prime requirement for the waveguide 14 is that it allows the propagation of high frequency stress waves therethrough without excessive attenuation. The frequency range of particular interest is 40 KHz to 1 MHz.

The waveguide 14 is specially constructed such that when it is subjected to significant deformation, e.g. bending, it activates the generation of broadband stress wave activity whose frequency content extends well above the audio frequency range into the range of particular interest, already mentioned. It is important that multiple source processes to generate the stress waves are able to be activated, the relative number is dependent upon the extent of deformation of the waveguide. The presence of a genuine collision is confirmed by the continuation of stress wave activity during the initial stages of the collision. The waveguide 14 is a metallic member which has a glass coating 16. The deformations of the metallic member results in cracking of the glass coating 16, and each individual crack in the glass coating 16 generates a stress wave pulse which propagates in the waveguide 14. The glass coating 16 is additionally protected by a second coating, e.g. a sleeve or tube, to prevent inadvertent deformation and spurious stress wave activity.

Although a glass coating has been applied to the metallic member other brittle materials, e.g. vitreous enamel or a ceramic may be used to coat the metallic member.

One or more transducers are acoustically coupled to the waveguide 14, in this example two transducers 20A and 20B are located at different positions on the waveguide. The transducers 20A and 20B detect the stress wave activity propagating in or along the waveguide. The transducers 20A and 20B convert the stress wave activity into electrical signals, and the electrical signals are amplified by amplifiers 22A and 22B respectively.

A processor 24 analyses the electrical signals to confirm the continued stress wave activity at or above a predetermined value during the initial stages of the collision when the waveguide is being deformed.

In FIG. 2 the transducers 20A and 20B have narrow bandwidths, and the transducers 20A and 20B have different frequency bands. The processor 24 compares the electrical signals from the transducers 20A and 20B. If the difference or ratio is above a predetermined value the processor determines that a collision has occurred.

If a collision is detected by the collision detector 12, the processor 24 sends an operating signal to a valve 26, so that the valve 26 allows fluid to be supplied from a supply of fluid 18 to a fluid bag 30 to cause the fluid bag to be inflated to restrain movement of at least one passenger.

It is to be noted that the waveguide is located on the vehicle, by positioning, mounting or enclosing such that spurious sources of high frequency stress wave activity which could be mistaken for a collision indication are not produced. The waveguide is thus located on the vehicle so that it is acoustically isolated from the vehicle, this prevents any stress wave activity generated in the vehicle structure being transmitted into or along the waveguide.

Figure 4:
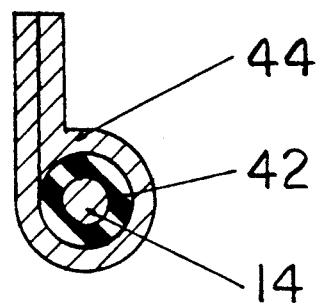
FIG. 4 is a side view in section of a member for acoustically isolating the mounting of the wave guide on the vehicle.
Figure 5:
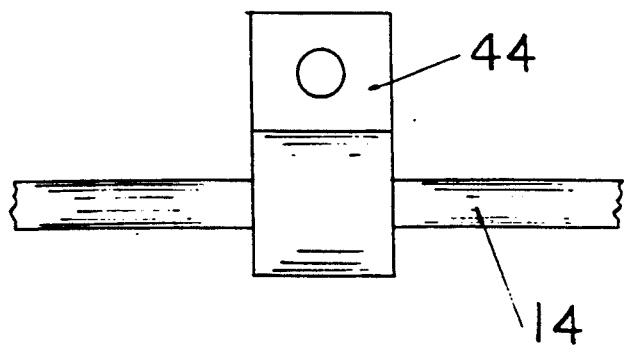
FIG. 5 is a front view in elevation of the member illustrated in FIG. 4.

With reference to FIGS. 4 and 5, there is illustrated a mounting device in the form of a metal bracket 44 which is shaped to fit around the waveguide 14 but which is isolated from the waveguide 14 by means of a rubber or suitable plastic ring member 42 which is carried in the opening of the metal bracket 44 formed by folding over the free edges of the bracket. As shown in FIG. 5, the waveguide 14 extends through the rubber ring 42 and is thereby isolated from the metal bracket 44 and thus from the vehicle body to which the bracket 44 is attached such as by being bolted through the aperture provided to a portion of the vehicle body. Several such brackets 44 and rubber members 42 may be employed. Alternately, the waveguide 14 may be mounted in apertures already provided in the vehicle body during normal manufacture but where the apertures are provided with the rubber or plastic ring members 42 to acoustically isolate the waveguide from the vehicle body.

The glass coated metallic member could be arranged so that the metallic member is only coated with glass at the regions of interest for crash detection. Thus the region of metallic member waveguide which is to be located at the front of the vehicle is coated with glass, but the remainder of the waveguide is not.

Alternately in FIG. 2 the transducers 20A and 20B may have broad bandwidths, and the amplifiers 22A and 22B may incorporate filters to select a frequency band, or to select two different frequency bands, of interest.

Figure 3:
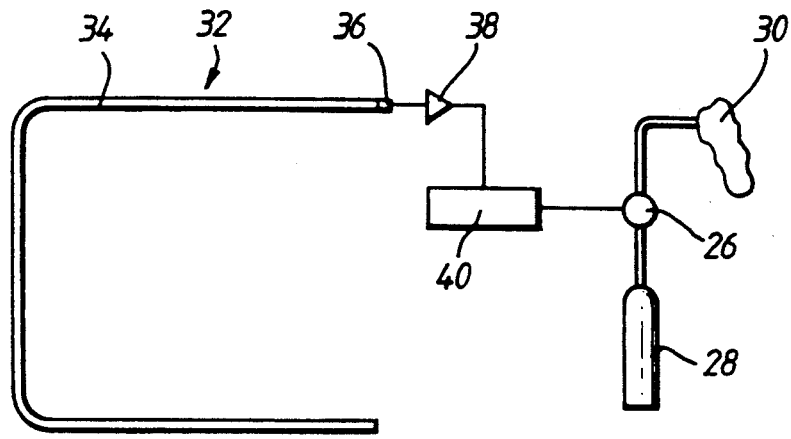
FIG. 3 is an alternative diagrammatical representation of the collision detector shown in FIG. 1.

A collision detector 32, in FIG. 3, comprises a waveguide 34 which is locatable on the vehicle shown in FIG. 1. The waveguide 34 is a fibre reinforced member in which the fibres transmit the stress wave signals to a transducer 36 and the stress waves are produced in the waveguide by the acoustic emission phenomena when deformed. The transducer 34 detects the stress wave activity propagating in or along the waveguide. The transducer 36 converts the stress wave activity into electrical signals, and the electrical signals are amplified by an amplifier 38, which may incorporate filters.

A processor 40 analyses the electrical signals to confirm the continued stress wave activity at or above a predetermined value during the initial stages of the collision when the waveguide is being deformed.

The processor 40 sends an operating signal to a valve 26 to allow the flow of fluid from a supply of fluid 28 to a fluid bag 30, as in FIG. 2.

As a further alternative the processor may make the decision to send an operating signal to the valve 26 in conjunction with information from other confirmatory sensors e.g. accelerometers.

Alternatively the waveguide is formed from a material which is plastically deformable by a twinning process, e.g. tin, and thereby gives rise to stress wave activity by the acoustic emission phenomena when deformed.

A further alternative waveguide comprises a metal member and a semi-rigid plastic material. Deformation of the waveguide causes friction and damage at the interface between the metal and plastic which gives rise to stress wave activity by the acoustic emission phenomena.

It is also possible to use wide bandwidth transducers and the processor is arranged to analyse the frequency content of the detected stress waves using a fast fourier transform.

The processors may analyse the amplitude of the stress waves, the RMS value of the stress waves, the intensity of the stress waves or any other suitable measure of the stress wave activity.

The use of a waveguide comprising a metallic member having a brittle coating, a waveguide comprising a fibre reinforced member, a waveguide comprising a metal member and a semi-rigid plastic member or a waveguide comprising a material plastically deformable by the twinning process all produce distinct and high amplitude stress wave activity and thus the electrical signals produced by the transducer have high signal to noise ratios to enable easier processing.

We claim:

1. A collision detector for a vehicle comprising a waveguide and means for acoustically isolating said waveguide from a vehicle, the waveguide having means for allowing the propagation of stress waves therein, the waveguide being arranged such that stress wave activity is produced therein due to the deformation of the waveguide in a collision, at least one transducer means being coupled to the waveguide for detecting any such stress waves propagating in the waveguide and for producing an electrical signal corresponding with such stress waves, a processor means arranged for analyzing said electrical signal to give an output signal to indicate the occurrence of a collision, said waveguide comprising a metallic member, said metallic member being coated with a brittle material.

2. A collision detector as claimed in claim 1 in which the metallic member is only coated with the brittle material at a region where a collision is to be detected.

3. A collision detector as claimed in claim 1 in which the brittle material is provided by a second coating.

4. A collision detector as claimed in claim 1 wherein the brittle material is one of glass, vitreous enamel and a ceramic.

5. A collision detector as claimed in claim 1 in which the waveguide comprises tin.

6. A collision detector as claimed in claim 1 in which the waveguide is plastically deformable.

7. A collision detector as claimed in claim 1 in which said metallic member has an interface with a semi-rigid plastic member.

8. A collision detector as claimed in claim 1 in which the processor means is arranged to compare the electrical signal from the at least one transducer means at different frequency bands.

9. A collision detector as claimed in claim 8 in which the said transducer means by different frequency bands.

10. A collision detector as claimed in claim 1 in which the at least one transducer means is a transducer capable of detecting substantially a single frequency.

11. A collision detector as claimed in claim 1 in which the processor means is arranged to operate a valve which controls the inflation of a fluid bag.

12. A collision detector for a vehicle comprising a waveguide and means for acoustically isolating said waveguide from a vehicle, the waveguide having means for allowing the propagation of stress waves therein, the waveguide being arranged such that stress wave activity is produced therein due to the deformation of the waveguide in a collision, at least one transducer means being coupled to the waveguide for detecting any such stress waves propagating in the waveguide and for producing an electrical signal corresponding with such stress waves, a processor means arranged for analyzing said electrical signal to give an output signal to indicate the occurrence of a collision, said waveguide comprising a fiber reinforced member.

* * * * *